United States Patent Office 2,874,096
Patented Feb. 17, 1959

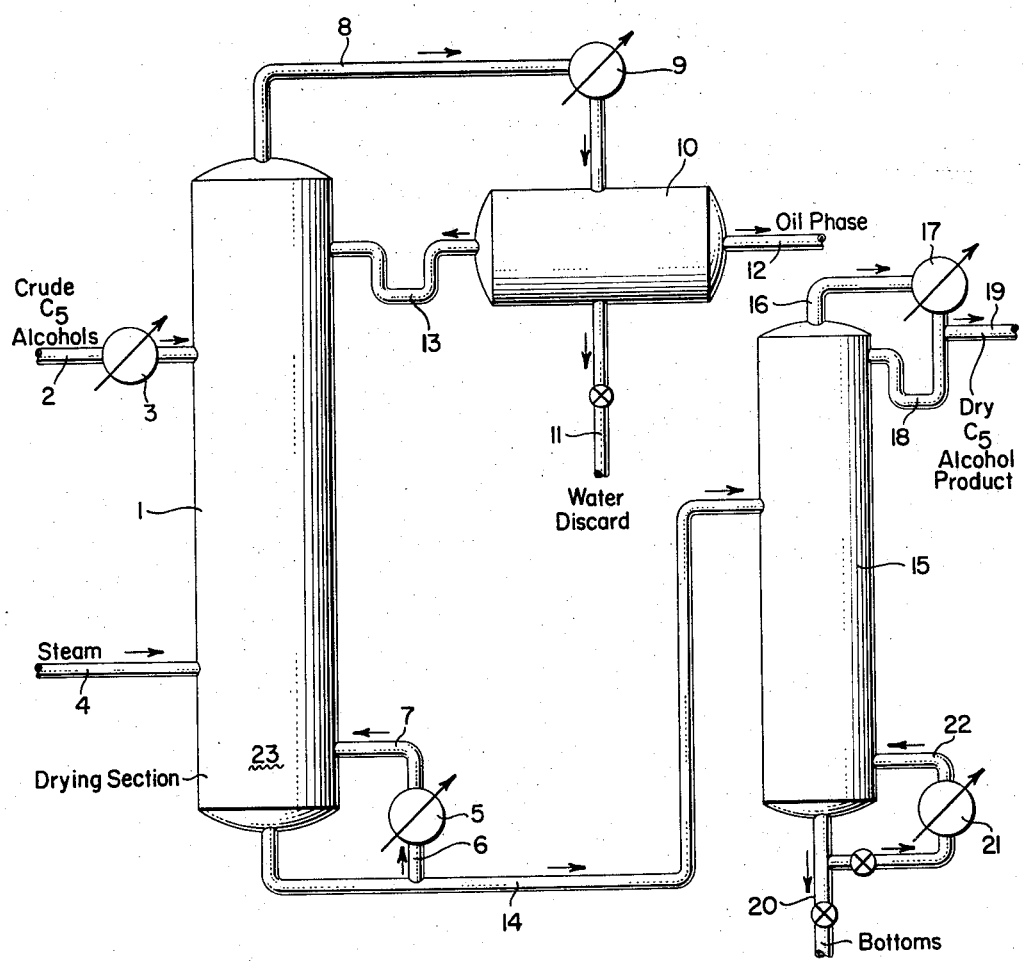

2,874,096

PURIFICATION OF AMYL ALCOHOL

Harold W. Scheeline, Elizabeth, and William E. Catterall, Roselle, N. J., assignors to Esso Research and Engineering Company, a corporation of Delaware Application January 26, 1954, Serial No. 406,174

3 Claims. (Cl. 202—40)

This invention relates to a process for purifying slightly water-soluble alcohols, such as amyl alcohols contaminated mainly by $C_{10}$ hydrocarbons, some lower hydrocarbons and aldehydes, difficult to separate from the alcohols by ordinary distillation. In this process water and steam are maintained in certain parts of a fractional distillation zone and in certain proportions therein to expel the contaminants with the least amount of alcohol and to leave the residual alcohol substantially free of water, of hydrocarbons, and of lower aldehydes.

The amyl alcohols produced by the Oxo process are particularly difficult to purify due to the presence in the crude alcohol mixture of $C_{10}$ hydrocarbons which form azeotropes with the $C_5$ alcohols. The $C_{10}$ hydrocarbons apparently are derived by a mechanism involving the dimerization of $C_5$ oxygenated compounds followed by deoxygenation of the $C_{10}$ oxygenated compounds. For example, the $C_5$ aldehyde which is an intermediate in the $C_5$ Oxo alcohol synthesis may aldolize to form $C_{10}$ aldol. The $C_{10}$ aldol may then be deoxygenated by a combination of hydrogenation and dehydration reactions occurring during the conventional hydrogenation of the Oxo synthesis product. The extent of the formation of $C_{10}$ hydrocarbons has been found to vary with process conditions, especially in the hydrogenation stage.

The process of this invention has been demonstrated in the purification of crude $C_5$ Oxo alcohols in which key impurities are $C_{10}$ hydrocarbons and organic substances having lower solubility in water than the alcohols, e. g. aldehydes. The water, preferably heated to about the distillation temperature, or in the form of steam, is injected into a fractional distillation zone preferably at a point between the crude alcohol feed inlet and a bottom part of the fractional distillation zone where the residual alcohol is to be obtained substantially free of water. The presence of adequate water in liquid condensate or fractional distillates above the water injection point increases the volatility of the hydrocarbon and other contaminants sufficiently to force the contaminants more selectively overhead with a minimum loss of the alcohol.

Due to the limited miscibility of water with the $C_5$ alcohols only a certain limited amount of water can be used in the fractional distillation zone to promote the desired separation. For pure primary amyl alcohols, the water-solubility in the fractional condensates at atmospheric distillation temperatures, is of the order of 30 to 40 mole percent, and the vapor phase in equilibrium with the liquid condensate at atmospheric pressure contains about 60 to 80 mole percent of water vapor. Maintaining conditions in the fractionation zone as close as possible to water saturation is the requirement for achieving successful separation of the impurities. Use of less water causes excessive distillation of the alcohol with the impurities. Use of more water causes difficulties in recovering the alcohol free of water.

An example of distillation test data obtained in demonstrating the advantages of the invention is the following:

On a heart-cut sample of $C_5$ Oxo alcohols containing about 6% $C_{10}$ hydrocarbons, efficient batch fractional distillation at atmospheric pressure eliminated all the $C_{10}$ hydrocarbons overhead, but with an alcohol loss of about 40% and the amyl alcohols formed about 89% of the overhead distillate. The loss of this alcohol to the overhead stream would be a serious economic disadvantage, necessitating further processing of the overhead stream by other means such as liquid-liqiud extraction or other separation methods apparent to those skilled in the art.

By carrying out the batch distillation in the presence of water by adding a large excess of water to the still pot, the amount of alcohol distilled overhead with the impurities was considerably reduced to make the loss of the alcohol about 10%. The overhead composition was about 55% alcohol, 45% $C_{10}$ hydrocarbon on a dry basis. The vapors passing up the column were estimated to be 80–85 mole percent steam. While the invention thus has been demonstrated on a heart-cut $C_5$ alcohol which could not efficiently be purified by ordinary distillation, there is no reason why the technique is not applicable directly to the purification of the crude $C_5$ alcohol mixture. This has been demonstrated as illustrated by the examples given later.

A convenient method for carrying out the invention is shown in the attached drawing of the flow plan.

The crude $C_5$ Oxo alcohol is fed to the fractional distillation tower 1 from line 2, through preheater 3. Steam is introduced into a lower point in column 1 from line 4. Additional plates are located below the steam inlet and a reboiler 5 is provided with recycle lines 6 and 7 for reboiling the bottoms. The reboiler provides heat for vaporizing the components of the bottoms and to aid in stripping and keeping the bottoms free of water. The vapors are taken overhead from column 1 by line 8 through condenser 9 to receiver 10. The condensed overhead separates into layers. A bottom water layer contains some of the alcohols and a small amount of other organic compounds. The bottom water layer may be discarded through line 11. The upper oil layer contains hydrocarbons with some aldehydes and alcohols. Part of this upper oil layer is withdrawn or purged from the system by line 12. Part of the upper oil layer is refluxed by line 13 to an upper part of column 1. Both the oil and water layer streams withdrawn may be processed by secondary methods for alcohol recovery if economically justified. A portion of the water layer may be fed as liquid or vapor back to the tower in place of pure steam. This reduces alcohol loss to the net water drawoff stream. Some of the water might be recycled to the Oxo synthesis.

The bottoms stream of dry alcohol and any higher boiling compounds other than hydrocarbons is passed by line 14 to a second tower or fractional distillation column 15 where the dry alcohol product is separated as an overhead distillate from high boiling bottoms by straight distillation. Overhead is withdrawn from column 15 by line 16 through condenser 17. A portion of the alcohol distillate is refluxed by line 18 to the upper part of column 15. The remaining portion is the recovered pure alcohol product withdrawn by line 19. High boiling impurities are drained from the bottom of column 15 by line 20. A portion of the bottoms is recycled through reboiler 21 and line 22.

In order to hold the maximum water content in the liquid reflux at all points in the tower it may be advantageous to add steam at more than one point in the tower. For example, engineering design calculations on the fractionation system have shown that it is desirable to add steam at the alcohol feed point in addition to the steam added below. This extra addition of steam at the feed point compensates for the change in internal vapor-liquid flow ratio which occurs at the feed point. The water content of the crude alcohol feed (typically about 4 volume percent) also must be taken into consideration.

The presence of relatively nonpolar bottoms in the liquid reflux below the crude alcohol feed point in column 1 has an adverse effect on the separation in depressing the water-solubility and water content of the liquid phase condensates. However, tests have shown that the desired concentration of water can be maintained in reflux between the alcohol feed inlet and the bottom drying section 23 to give the desired separation effects.

Although it is possible to use atmospheric pressure to distill the contaminants and water from the alcohol, use of higher pressures, e. g. 20 to about 200 p. s. i. g. in the fractionation zone are preferred for obtaining a more suitable high temperature to make the liquid alcohol-water mixture a homogeneous solution in the column. The critical solution temperature is the minimum temperature at which the components are miscible in all proportions. For the mixture of $C_5$ primary alcohols, this temperature is about 370° F. and the necessary pressure for obtaining this temperature is about 160 p. s. i. g. When the critical solution temperature is reached or exceeded there is no longer any solubility limitation on the amount of water that can be introduced into the liquid reflux. However, in order to remove dry $C_5$ alcohol from the bottom of the tower, the amount of water in the liquid reflux must be less than the water content of the $C_5$ alcohol-water azeotrope at the conditions employed.

For crude $C_4$ Oxo alcohols the critical solution temperature is somewhat lower. For example, when the $C_4$ alcohol is normal butanol, the critical solution temperature is 257° F. and the necessary distillation pressure is about 20 p. s. i. g. Accordingly, for crude alcohol mixtures containing butanols and pentanols to be purified, the distillation temperatures are of the order of preferably 250 to 360° F. in the wet zones of the column and 290° to 480° F. at the bottom of the column with pressures in the range of 20 to 200 p. s. i. g. in the column.

Analytical data were obtained on a number of typical Oxo $C_5$ alcohol crudes to determine the kinds and quantities of impurities which had to be separated by the process described. The alcohols in these crudes include nearly equal amounts of normal pentanol, 3-methyl butanol-1, and 2-methyl butanol-1. These alcohols boil mainly in the range of 260° to 285° F. Their hydrocarbon impurities in pure form boil in the range of 300° to 340° F. and are present in amounts ranging from less than 1% to about 9%. A substantial proportion of the hydrocarbon impurities are olefinic and were determined as decenes. From the carbonyl number, it was determined that there was an appreciable amount of aldehyde present. The still higher boiling impurities boiling above about 360° F. constitute up to about 12 weight percent of the crude alcohol feed and is the material from which the dry alcohols can be easily separated by conventional distillation.

Operating data and material balances obtained in a typical purification of an Oxo amyl alcohol crude in a 30-plate continuous atmospheric distillation column are shown in the following example:

Table 1

| Example | I | II |
|---|---|---|
| Feed, Parts by Volume: | | |
| Crude (to plate 15) | 248 | 150 |
| Lower Steam (to plate 5) (expressed as liquid) | 205 | 263 |
| Upper Steam (to plate 15) (expressed as liquid) | 43 | 43 |
| Product Streams, Parts by Volume: | | |
| Organic Overhead | 94 | 45 |
| Water Overhead | 259 | 278 |
| Bottoms | 130 | 95 |
| Organic Layer Reflux (to plate 30) | 517 | 225 |
| Temperature, °F.: | | |
| Overhead | 198 | 194 |
| Bottoms | 297 | 225 |
| Reflux | 104 | 77 |
| Alcohol Content, Parts by Volume: | | |
| Feed | 179 | 108 |
| Organic Overhead | 67 | 29 |
| Water Overhead | 6 | 6 |
| Bottoms | 93 | 68 |
| $C_{10}$ Hydrocarbon Content, Parts by Volume: | | |
| Feed | 21 | 13 |
| Organic Overhead | 24 | 14 |
| Water Overhead | 0 | 0 |
| Bottoms | 0 | 0 |

In both of these runs $C_5$ alcohol completely free of $C_{10}$ hydrocarbons as determined by careful mass spectrometer analysis was obtained by redistillation of the bottoms to remove residual impurities such as $C_{10}$ glycols, $C_{10}$ ethers, $C_{10}$ alcohols, $C_{15}$ acetals, and $C_{10}$ and higher esters. The overhead streams contained in addition to $C_{10}$ hydrocarbon, $C_5$ alcohol, and water a minor amount of light impurities in the crude, including $C_4$ hydrocarbons and $C_5$ aldehydes. In Run II insufficient reboiler heat was supplied and the bottoms stream was not dry, as indicated by the low bottoms temperature. The alcohol loss to the combined overhead streams in these runs amounted to 27–36% of the alcohol in the feed. It is obvious that these runs do not represent optimum conditions. A reduction in the amount of organic overhead withdrawn would have reduced the alcohol loss without significant increase in the $C_{10}$ hydrocarbon content of the bottom stream. Engineering design calculations for a commerical fractionation tower which represent a closer approach to the optimum conditions are tabulated below:

Table 2

| Test Samples | A | B |
|---|---|---|
| Flow rates: | | |
| Crude alcohol to Tray 15, gal | 100 | 100 |
| Bottoms product, gal | 78.5 | 65.3 |
| Overhead water layer product, gal | 94.0 | 113.0 |
| Overhead oil layer product, gal | 15.4 | 28.9 |
| Oil layer reflux to Tray 30, gal | 202 | 227 |
| Steam to Tray 15, lb | 111 | 111 |
| Steam to Tray 5, lb | 619 | 779 |
| Temperatures, °F.: | | |
| Feed preheat | 200 | 200 |
| Tower Top | 200 | 200 |
| Tower Bottom | 300 | 300 |
| Reflux | 200 | 200 |
| Pressures, p. s. i. g.: | | |
| Tower top | 0 | 0 |
| Tower bottom | 3 | 3 |
| Compositions, vol. percent: | | |
| $C_5$ alcohol— | | |
| Feed | 68.0 | 68.0 |
| Water overhead | 2.3 | 2.3 |
| Oil overhead | 62.0 | 63.0 |
| Bottoms | 71.6 | 72.2 |
| $C_{10}$ Hydrocarbon— | | |
| Feed | 5.0 | 9.0 |
| Water overhead | nil | nil |
| Oil overhead | 33.7 | 34.5 |
| Bottoms | 0.35 | 0.35 |
| $C_5$ aldehyde— | | |
| Feed | 0.7 | 0.7 |
| Water overhead | 0.1 | 0.05 |
| Oil overhead | 4.0 | 2.2 |
| Bottoms | nil | nil |
| Heavy Ends: | | |
| Feed | 21.3 | 17.3 |
| Water overhead | nil | nil |
| Oil overhead | nil | nil |
| Bottoms | 28.0 | 27.4 |
| Water: | | |
| Feed | 5.0 | 5.0 |
| Water overhead | 97.6 | 97.6 |
| Oil overhead | 0.3 | 0.3 |
| Bottoms | 0.07 | 0.07 |

The amyl alcohol can readily be separated from the heavy ends in a subsequent straight distillation tower. The alcohol so recovered would contain about 0.5 vol. percent $C_{10}$ hydrocarbon and 0.1 vol. percent water. This would make an entirely acceptable commercial product, although further reductions in hydrocarbons and water content could be made if desired, by increasing the number of plates in the steam tower.

It is to be noted that substantial losses of $C_5$ alcohol to the overhead streams occurs, amounting to 17% and 31% losses for the two cases given. Conventional recovery methods may be applied to the overhead streams to recover the alcohol content. These include such methods as liquid-liquid extraction, adsorption, etc. The bulk of the water layer may be vaporized and recycled to the tower in place of extraneous steam, to recover the alcohol content of this stream. This would not lead to excessive contamination of the alcohol product with $C_5$ aldehyde because the $C_5$ aldehyde content of the water layer is quite low.

Having described the invention it is claimed as follows:

1. A process for purifying crude amyl alcohol containing $C_{10}$ hydrocarbon impurities which comprises fractionally distilling the crude alcohol in a fractional distillation zone by injecting water as steam at a point lower than the point where the alcohol feed enters at a temperature at which the alcohol and water are homogeneously mixed with said water comprising 30 to 40 mol percent of the resulting reflux without forming therein a second liquid phase, removing $C_{10}$ hydrocarbons with water and a portion of the alcohol overhead leaving the water content of said mixture at the bottom of said zone less than the water content of the amyl alcohol-water azeotrope under the conditions employed, stripping the alcohol reflux of remaining water and then distilling the residual dry alcohol from residual higher boiling contaminants.

2. A process for purifying crude amyl alcohol containing $C_{10}$ hyrdrocarbon impurities which comprises fractionally distilling the crude alcohol in the presence of water at a temperature at which the alcohol and water in a single phase fractional distillation zone form a homogeneous mixture in which said water comprises 30 to 40 mol percent of the resulting reflux, removing $C_{10}$ hydrocarbons with water and a portion of the alcohol overhead leaving the water content of said mixture at the bottom of said zone at all times less than the water content of the amyl alcohol-water azeotrope under the conditions employed, stripping the alcohol reflux of remaining water and then distilling the residual dry alcohol from residual higher boiling contaminants.

3. A process according to claim 1 in which conditions in the fractional distillation zone are maintained as close as possible to water saturation.

References Cited in the file of this patent

UNITED STATES PATENTS

| | | |
|---|---|---|
| 2,437,649 | Milner | Mar. 9, 1948 |
| 2,556,030 | Coulter et al. | June 5, 1951 |
| 2,614,128 | Mertzeweiller | Oct. 14, 1952 |
| 2,635,072 | Eliot | Apr. 14, 1953 |

FOREIGN PATENTS

| | | |
|---|---|---|
| 663,561 | Great Britain | Dec. 27, 1951 |